United States Patent [19]
Worden

[11] 3,836,701
[45] Sept. 17, 1974

[54] APPARATUS FOR SPLICING CABLES

[76] Inventor: Owen Winram Worden, 2809 Uplands Crescent, Abbotsford, British Columbia, Canada

[22] Filed: Oct. 18, 1972

[21] Appl. No.: 298,484

[30] Foreign Application Priority Data
Apr. 11, 1972 Canada .............................. 139387

[52] U.S. Cl. .............. 174/93, 174/77 R, 174/138 F
[51] Int. Cl. ............................................ H02g 15/08
[58] Field of Search .............................. 174/91–93, 174/138 F, 77 R, 74 A

[56] References Cited
UNITED STATES PATENTS
3,215,613  11/1965  Lainson ........................... 174/93 X
3,458,649  7/1969  Channell ............................. 174/93
FOREIGN PATENTS OR APPLICATIONS
1,160,060  7/1969  Great Britain ....................... 174/93

Primary Examiner—Darrell L. Clay
Attorney, Agent, or Firm—Fleit, Gipple and Jacobson

[57] ABSTRACT

A cable splice method and housing includes a central section with an internal diameter larger than the diameter of the cable to be spliced whereby the housing is movable lengthwise to permit access to a splicing zone. A pair of end plugs are arranged to accommodate the outer covering carrying the cable in fluid-tight engagements, each end having an outside diameter such as to accept an end part of the central section and a sealing ring fitted to each end plug and encircling the plug in close proximity to the adjacent end of the central section. Anchoring means secure the central section to the end plug and clamp means are arranged to encircle both the sealing ring and the adjacent end of the central section to complete a fluid-tight seal between the end plug and said central section.

7 Claims, 8 Drawing Figures

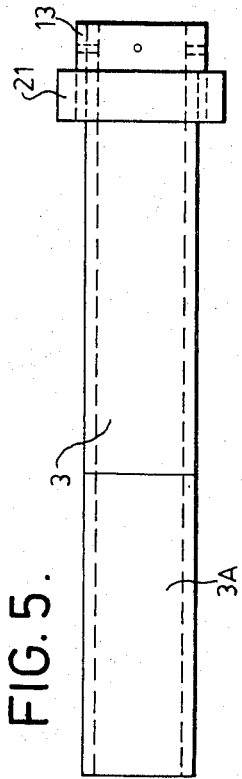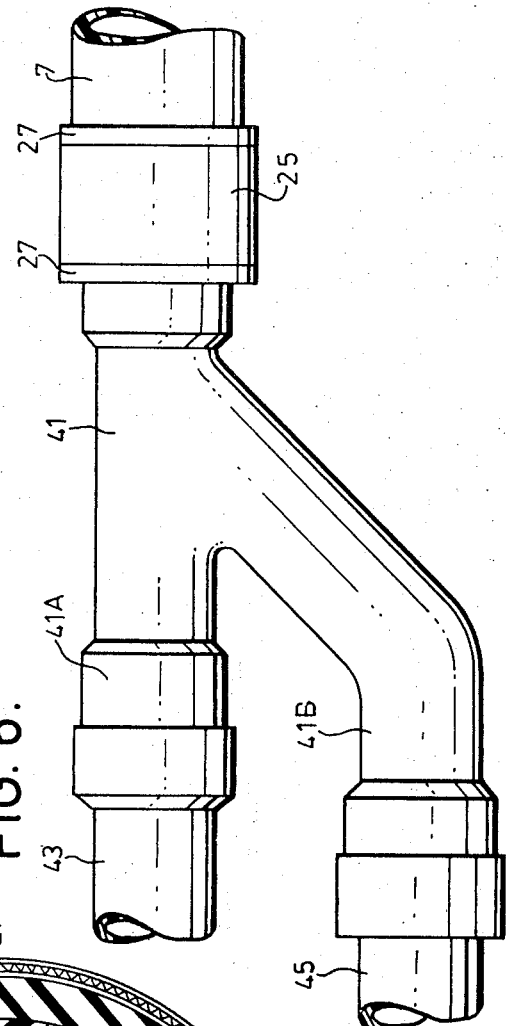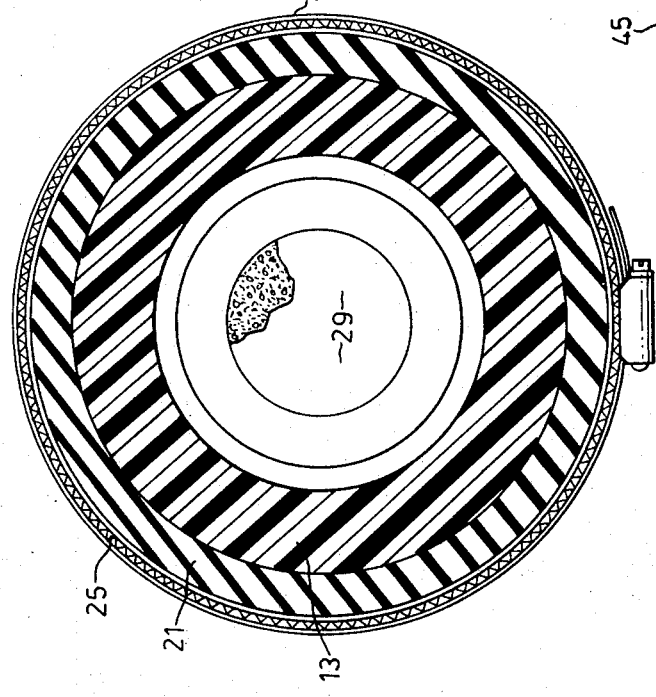

APPARATUS FOR SPLICING CABLES

This invention relates generally to cases for the housing of splices in electrical cables. Although the invention finds particular utility in the provision of cases for multicore cables such as telephone cables it can be used in suitable situations for housing splices in power carrying cables.

When two cables are spliced, it is important that the splice is protected mechanically and also that it is electrically protected by proper insulation. It should also be protected from the ingress of moisture and air, which may be moisture laden and, accordingly, potentially damaging. For this reason, use is usually made of a cast iron junction box or service box, into which the ends of the cables to be spliced are brought, the necessary splicing being normally carried out through an open top of the box. When the splicing is completed, the top of the box is added and the box is filled with a solidifying electrical insulator. In some such boxes, a lead inner box is used which is plumbed to the lead covering of the cables. In all such boxes, the box is heavy, rigid and expensive, and once it has been used, it is usually difficult, if not impossible, to open the box and carry out further work on the splices without destroying the box. Although in hydro installations this may not be too important, in multiple telephone cable systems it would be of considerable convenience and economy if such a splice box could be readily opened, word carried out on the conductors therein, and the box then properly resealed.

According to the present invention, a cable splice housing comprises a tubular central section having an internal diameter larger than the diameter of the cable to be spliced, whereby said housing is movable lengthwise away from a splicing zone to permit free access to said splicing zone, a pair of end plugs each arranged to accommodate in a fluid tight manner the outer covering carrying said cable, each end plug having an outside diameter such as to accept an end part of said tubular central section, a sealing ring fitted to each end plug and encircling said plug in close proximity to the adjacent end of said central section, anchoring means mechanically securing said central section to said end plug and clamp means arranged to encircle both the sealing ring and the adjacent end of said central section and to complete a fluid-tight seal between said end plug and said central section.

The invention will now be described, by way of example, only with reference to the accompanying drawings, in which:

FIG. 4 is a transverse section taken on the line IV—IV of FIG. 3 and viewed in the direction indicated by the arrows;

FIG. 5 is a side elevation of an auxiliary pipe which can be used with the splice case shown in FIG. 1;

FIG. 6 is a side elevation illustrating the use of the splice case where a tap is required from a cable;

Figure 1:
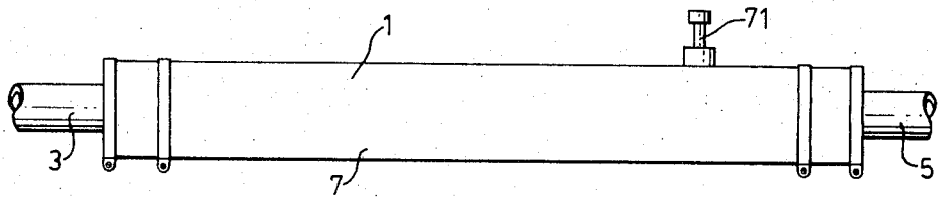
FIG. 1 is a side elevation of a splice case for use in a cable vault.

Referring first to FIG. 1, the splice case 1 is used to enclose a large number of splices between two multicore telephone cables which extend respectively through pipes 3 and 5. For the most part, the splice case comprises a 2 feet long length 7 of standard heavy duty plastic tubing, such as is used to convey water and typically would be rated to withstand an internal pressure of 600 pounds per square inch. Such tubing is available in a number of standard internal diameters, and the size used for the splice case 1 will depend upon the sizes of the pipes 3 and 5 and upon the nature of the splices to be contained by the case. A typical size would be an internal diameter of 3 inches, but the invention can be applied to tubing of, for example, 8 inches diameter when so desired.

Figure 2:
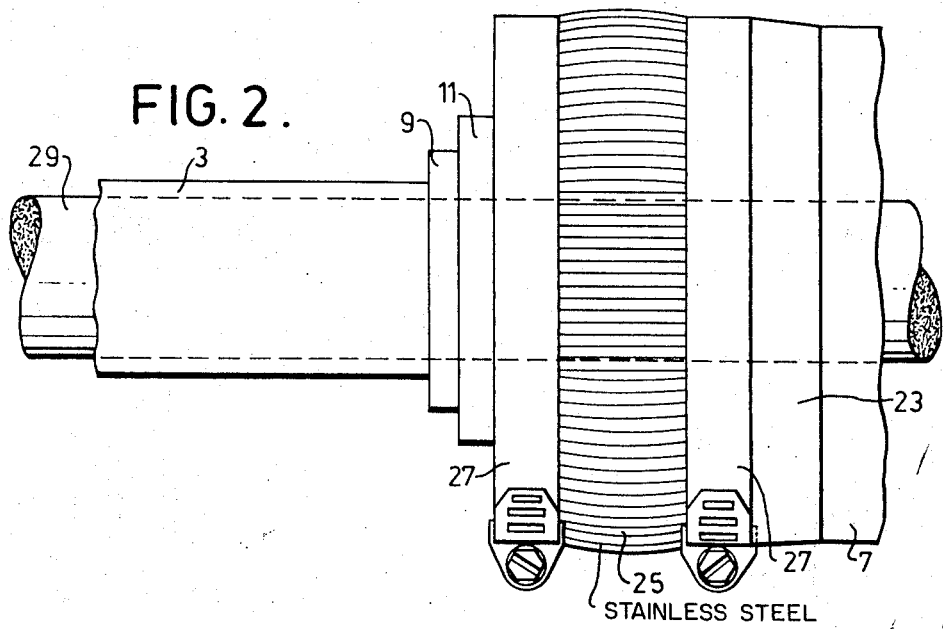
FIG. 2 is a side elevation of a left-hand end only of the splice case shown shown in FIG. 1, and is drawn to a much larger scale than FIG. 1.
Figure 3:
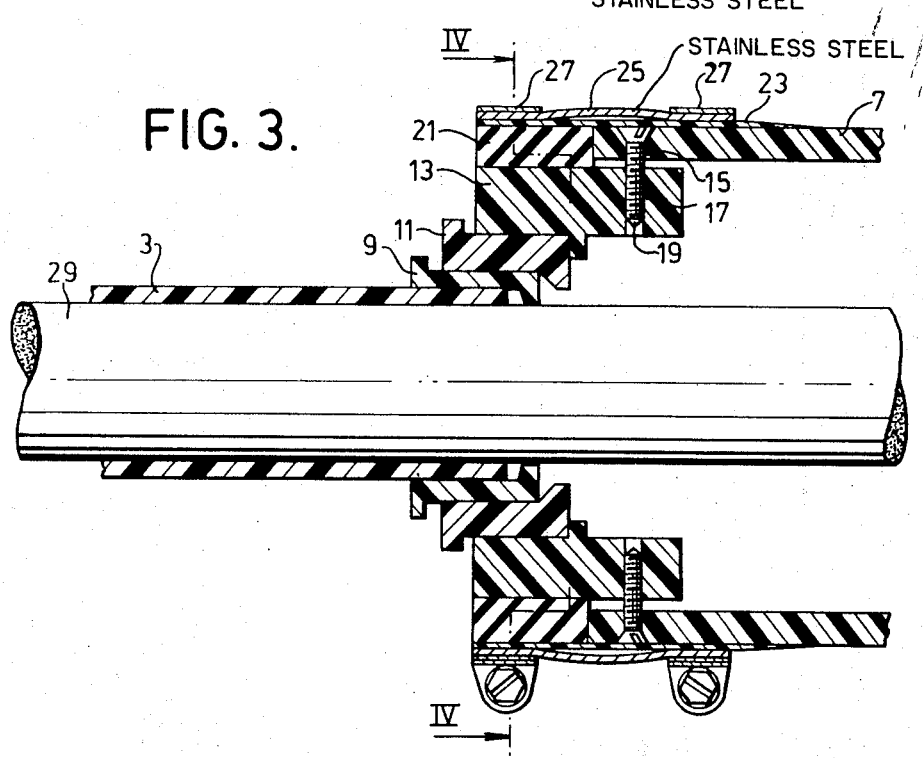
FIG. 3 is a sectional side elevation of the parts shown in FIG. 2.

At one end, the length 7 is connected to the pipe 3, and at the other end to the pipe 5, in each case by a similar joint which is mechanically strong and which is water and air proof to the standards required for such cable splices. FIGS. 2 and 3 show the details of the joint between the length 7 and the pipe 3. It will be appreciated that the joint at the other end is of similar construction.

In the example shown, the pipe 3 is of considerably smaller external diameter than the internal diameter of tubing length 7, and standard plastic couplings 9, 11 and 13 are inserted onto the end of the pipe 3, in that order, to bring the outside diameter of the assembly to a size slightly smaller than the inside of tubing length 7. These couplings are fixed in place on the pipe 3 and to one another by standard tube cement used in the trade for fixing together this form of plastic tube in a fluid-tight manner. The end of tubing length 7 is formed at four equally spaced circumferential locations with radial holes such as holes 15, which are aligned with similar holes 17 in the outermost section of the couplings, i.e. coupling 13. Steel screws 19 are entered into the holes 17, and thus form a secure mechanical connection between pipes 3 and 5 through the various couplers and the tubing length 7.

It will be clear from FIG. 3 that the arrangement of the present invention is such that the tubing length 7 does not extend as far as the outward end of the outermost coupling 13, and on the uncovered part of that coupling is secured, by a suitable adhesive, a firm rubber sealing ring 21. The outside diameter of the ring 21 is substantially equal to the outside diameter of the tubing length 7, and the ring abuts against the end of the tubing length 7.

Four to six layers of vinyl tape 23, one inch wide, are wound in an overlapping manner over the ring 21 and the adjacent part of the tubing length 7, as indicated in FIG. 3. This forms a smooth water and air-tight seal over the joint between the ring and the tubing length, and over the outer ends of the screws 19 which are countersunk to facilitate the operation. A stainless steel strip 25 of corrugated form indicated in FIGS. 2 and 4 is provided, the strip having a width of two inches and a length such that it can extend round the tubing length 7 and an overlap of about 1 inch. The strip 25 is fitted flush with the outer end of the ring 21 and extends over most of the length of the tape 23. Fitted over the strip 25 are two stainless steel hose clamps 27, which are standard components and have a width of about one half of one inch and are provided with a worm screw tightening device which engages slots cut in the strips of the clamp and forming teeth for engagement by the worm. In the assembled joint, the clamps 27 and the strip 25 form the mechanical support for the vinyl tape, which provides the fluid tight seal between ring 21 and tube length 7.

As will be clear from FIG. 3, the cable 29 which extends through pipe 3 extends past this joint into the main part of the tubing length 7, in which its conductors are separated, bared, connected to the appropriate conductors in the other cable, and reinsulated.

It will be seen that during the actual splicing operation, the tubing length can be passed over one of the cable ends to be spliced, and pushed along out of the way of the operative who is to do the splicing. The necessary couplers 9, 11 and 13 are fixed into place on each pipe end, and the two rings 21 are also put in place but are not fixed to the outermost couplers 13.

The operative now has a completely free field of operation in which he can work on his splicing of the conductors of the cables, there being no splice box or case to impede his access to the work. When the operator has finished his splicing, the tubing length 7 is slid along over the spliced part of the cable, and at each end the four screws 19 are inserted to fix the tubing length 7 solidly in position. The two rubber rings 21 are then fixed in position.

However, if desired, one of the rings 21 can be fixed in place early in the process, and the second ring 21 can be fixed in place once the splices have been made but before the tubing length 7 is fixed to the two couplings 13.

The layer of tape 23 is then applied to each joint as described and illustrated, and the strip 25 and the two clamps 27 put in place, and the clamps tightened. Although not specifically shown in the drawings, it has been found convenient to attach the strip 25 to the two hose clamps by spot welds at about the mid-height of FIG. 2, since this assists in assembly of the parts and does not introduce any inconvenient constraints as the clamps 27 are tightened.

It will be appreciated that the pipes 3 and 5 which carry the cables are built up from lengths secured to one another by socket and spigot joints and the use of bonding adhesive, this being the standard technique used by plumbers in assembling plastic piping. To reduce on-the-job work, the elements required for the splice case of FIGS. 1 through 4 can be prepared in the workshop and supplied as a unit. In such a case, each pipe 3 may be in the form of a short length of plastic tubing (as shown in FIG. 5) carrying the couplers such as coupler 13 and the ring 21, and having an outer part of its length indicated by 3A roughened to facilitate its connection (with the appropriate adhesive or cement) to an adjacent length of pipe in which the cable is already installed.

When it is required not merely to splice the two cable ends together, but to take off a lateral lead use can be made of a Y-piece 41 as indicated in FIG. 6. In that case, the splices are all made in the tubing length 7, but one of the main cables and the lateral leads are taken out of one end of the splicing case, and the main cable is taken off through one leg 41A of the Y-piece and pipe 43, while the lateral lead is taken off through leg 41B and pipe 45.

Figure 7:
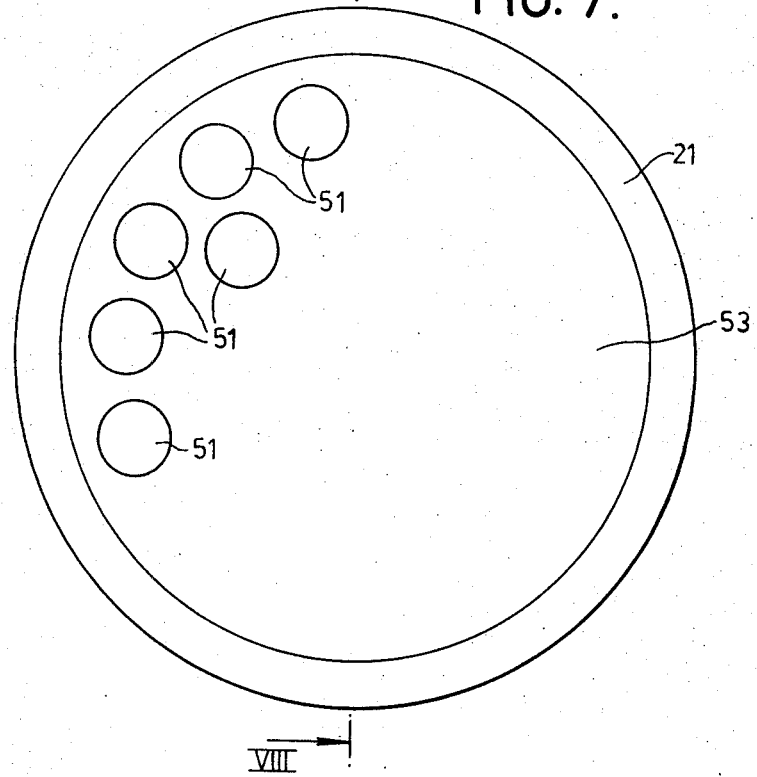
FIG. 7 is an end view of a modification of the splice case, adapted to receive several separate cables.
Figure 8:
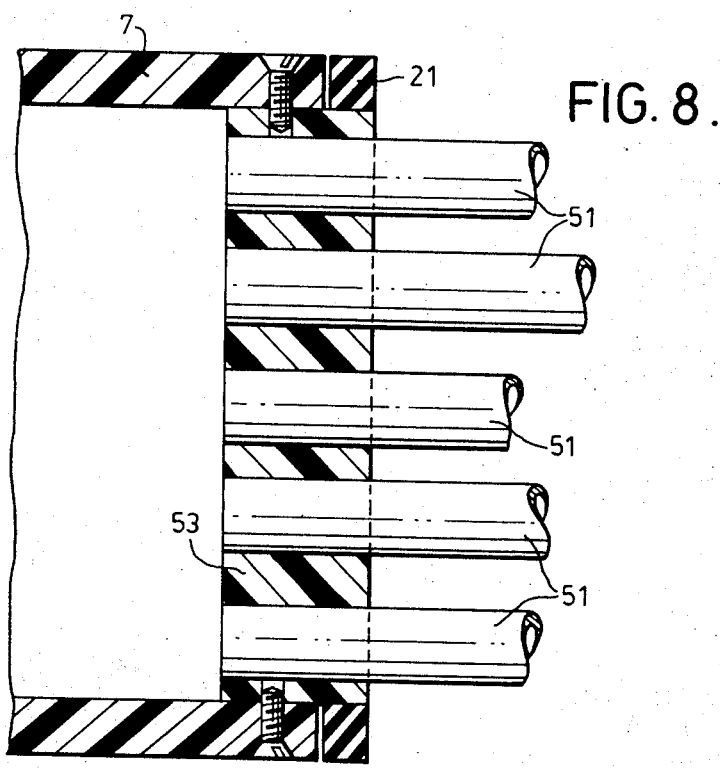
FIG. 8 is a sectional side elevation taken on the line VIII—VIII of FIG. 7.

Although in the arrangements of FIGS. 1 through 6 only one pipe was connected to each end of the splice case, FIGS. 7 and 8 show how several pipes can be connected to one end of the case. In the arrangement of those figures, a large number of pipes 51, typically 30 — although a few are shown by way of illustration — are fitted into and sealed in a fluid-tight manner to, a disc 53 which carries the sealing ring 21 and has fitted over it, and secured thereto, the adjacent end of tubing length 7. The said fluid-tight seal is effected by the use of a suitable adhesive or cement, as is well known in this art of joining plastic pipes. The joint is completed as shown by use of the tape 23 and strip 25 in the manner described above with reference to FIGS. 2 and 3.

The arrangement of FIGS. 7 and 8 can be used when the splice case is to contain splices between adjacent ends of a number of cables, in each pair of cables one entering the splice case through one end and the other through the other end. On the other hand, it can also be used at one end only of the splicing case while a single cable entry, such as that shown in FIGS. 1 through 3, can be used at the other end. In such an arrangement, a single multicore cable entering the "single" end of the splice case can be broken down to a number of cables which leave the other end of the splice case respectively through the separate pipes 51. In another use, a single entering cable at one end can be arranged to feed in parallel a large number of branches leaving respectively through the separate pipes 51 at the other end.

It will be seen that the splice case which has been described is both simple in construction and use, and versatile in that a number of different standard ends can be mated as desired to a standard central tubing length. During the making of the splices, the operator has a completely unobstructed working field. When necessary, the splice case can readily be opened up and reused. The only part which might be damaged in that proceeding is the rubber ring 21, and even this can be allowed for if so desired by initially threading two or three such rings over each pipe 3 and 5, so that each time the splice case is opened the innermost ring can be cut off and discarded, and use made of the next ring, so avoiding the need to use split rings when a damaged ring has to be replaced.

It will be appreciated that in some cases the cable may include an integral sheath which takes the place of the pipe 3 or 5. This will not often be the case, since the mechanical requirements of a cable sheath rarely will correspond with the mechanical requirements of a cable containing pipe. A more probable arrangement would be for a cable to enter a short length of pipe, such as that shown in FIG. 5, and to be sealed to that pipe by a suitable cement or adhesive coating onto the surface of the cable and allowed to harden inside the pipe 3 to bond the cable to the pipe and to provide a fluid-tight seal between the cable and the pipe. Howver, it will be clear to those skilled in the art that such an arrangement can make use of the splice case of the present invention.

An air valve 71 is illustrated in FIG. 1 which can be used if desired to remove air from the inside of the splice box, or to replace the air inside the box with a suitable inert gas, or to establish an internal pressure inside the box somewhat higher than ambient, to ensure that any leakage shall be out of the box rather than into the box. The use of such an air valve will be familiar to those skilled in this art.

It will be appreciated that broadly speaking the method aspect of the present invention comprises the steps of passing a casing over an end of a cable to be spliced so as to provide ready access to a splicing zone, effecting at least partial splicing of said cables, positioning said casing so as to provide a protective covering for the spliced ends of the cables, positioning coupling members at the ends of said casing, and securing said coupling members in position on said cables. However, the specific manner in which the end couplings are urged into position around said cable may be varied at the discretion of the operator providing the end result of a waterproof casing in secured position around the splicing zone.

The cable splice case of the present invention represents a clear advance in the art which will be of benefit to the industry and the public generally.

I claim:

1. A cable splice housing comprising:
   a. a tubular central section having an internal diameter larger than the diameter of the cable to be spliced;
   b. a pair of end plugs each adapted to receive the outer covering carrying said cable in a fluid-tight manner;
   c. each end plug having an outside diameter receiving an end part of said tubular central section;
   d. a sealing ring fitted to each end plug and encircling said plug in close proximity to the adjacent end of said central section;
   e. anchoring means for each said end plug, said anchoring means mechanically securing said central section to said end plug;
   f. a layer of impervious material covering said sealing ring and the adjacent part of the central section sealing a gap between said ring and said central section; and
   g. clamp means encircling said layer of impervious material and both the sealing ring and the adjacent end of said central section completing the fluid-tight seal between said end plug and said central section.

2. A cable splice housing as claimed in claim 1, in which said layer is a tightly wound layer of an impervious tape.

3. A cable splice housing as claimed in claim 2, in which said clamp means for the impervious tape is provided in the form of an encircling strip of suitable material, and means holding said material in place comprising hose clips at least partially encircling said material.

4. A cable splice housing as claimed in claim 3, in which said encircling strip is formed of a metal strip provided with corrugations which extend transversely thereof.

5. A cable splice housing as claimed in claim 3, wherein said encircling strip is formed of stainless steel.

6. A cable splice housing as claimed in claim 1, wherein at least one of said end plugs has a plurality of openings for receiving in a fluid-tight manner respectively a pair of cables.

7. A cable splice housing as claimed in claim 1, wherein at least one of said end plugs has a plurality of nesting couplers having an outermost one of said couplers supporting said sealing ring and an innermost one of said couplers for receiving said cable.

* * * * *